July 2, 1929. N. CHRISTIANSEN 1,719,046
MEANS FOR INDICATING CHANGE IN FLUID TEMPERATURE
Filed March 18, 1925 2 Sheets-Sheet 1
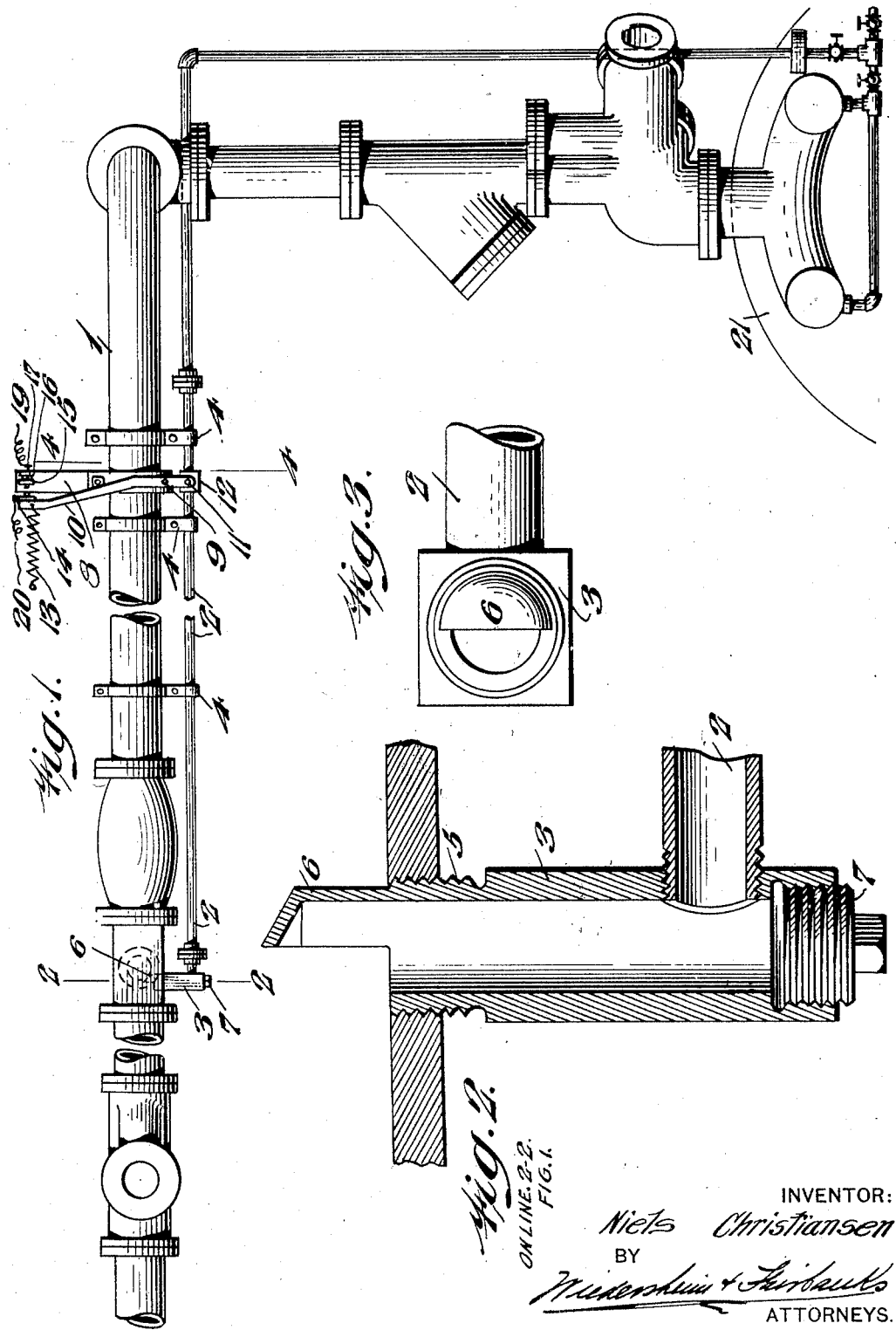
INVENTOR:
Niels Christiansen
BY
ATTORNEYS.

July 2, 1929.  N. CHRISTIANSEN  1,719,046
MEANS FOR INDICATING CHANGE IN FLUID TEMPERATURE
Filed March 18, 1925   2 Sheets-Sheet 2
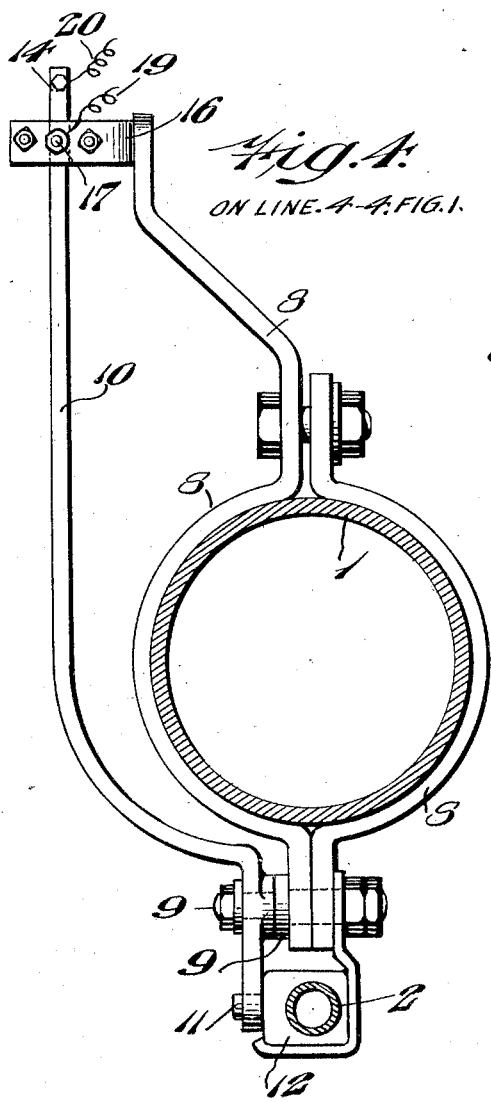
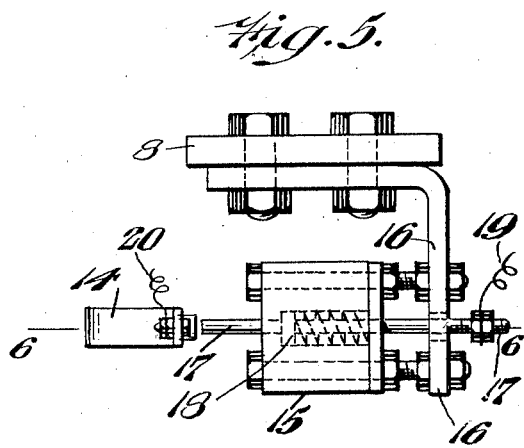
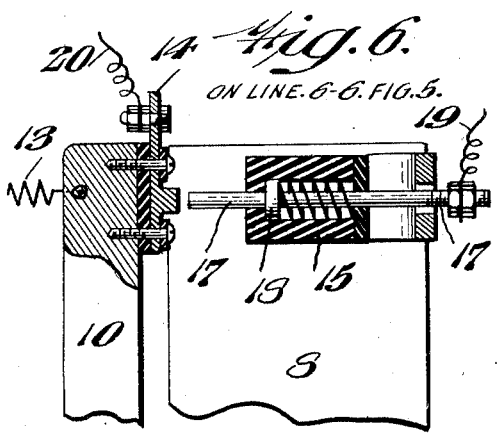
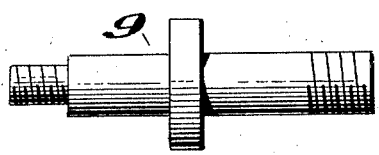
INVENTOR:
Niels Christiansen
BY
ATTORNEYS.

Patented July 2, 1929.

1,719,046

UNITED STATES PATENT OFFICE.

NIELS CHRISTIANSEN, OF NEWPORT NEWS, VIRGINIA, ASSIGNOR TO NEWPORT NEWS SHIPBUILDING AND DRY DOCK COMPANY, OF NEWPORT NEWS, VIRGINIA.

MEANS FOR INDICATING CHANGE IN FLUID TEMPERATURE.

Application filed March 18, 1925. Serial No. 16,536.

This invention, stated in its broadest terms, relates to means for indicating the change in temperature of a fluid and has more especial relation to a device for indicating change in temperature of steam passing to a prime mover. It is a well known fact that the presence of moisture in steam admitted to turbines causes a loss of efficiency, and contributes to the erosion and corrosion of blading and other internal parts. In reciprocating steam engines the presence of moisture not only causes large loss of efficiency and excessive wear on packing rings, but may lead to knocking in the cylinders or to serious damage to the cylinders, cylinder heads, or other parts of the engine. In many land and marine steam power plants, means for superheating the steam are fitted for the purpose of preventing or reducing these losses.

According to the present invention I install in plants fitted with superheaters a device to give warning of the presence of moisture in the main steam supply pipe, so that steps may be immediately taken to restore the superheat. Such condition of moisture may arise when a boiler foams or primes, due to water being carried at too high a level, or due to the presence of foreign matter in the water. According to the present invention I also employ means to indicate a drop in temperature of steam of any predetermined amount, irrespective of whether or not such drop in temperature is traceable to the presence of moisture in the steam. According to the present invention I employ a primary fluid conducting member and a secondary fluid conducting member, which latter is made of material having a greater coefficient of expansion and a higher thermal conductivity than the primary member. According to the present invention, I also divert through the secondary member a portion of the fluid flowing through the primary member for operating an indicating lever or other device connected to the secondary member and preferably pivoted to the primary member, whereby, any relative movement of the two members, due to differences in their contraction or expansion upon change of fluid temperature will function to indicate visibly or audibly the movement of the free end of said lever.

My invention consists of other novel features of construction and advantage all as will be hereindescribed and pointed out in the claims appended hereto.

The nature, characteristic features and scope of the invention will be more fully understood from the following description taken in connection with the accompanying drawings forming part hereof, and in which:

Fig. 1, is a view in elevation of a main steam supply pipe equipped with a device embodying the invention.

Fig. 2, is a view in vertical section of a steam nozzle shown in Fig. 1.

Fig. 3, is a top or plan view of the tap shown in Fig. 2.

Fig. 4, is a view in cross section taken upon the line 4—4 of Fig. 1.

Fig. 5, is a detail view of the electrical contact shown in Fig. 1.

Fig. 6, is a view taken upon line 6—6 of Fig. 5; and

Fig. 7, is a view of the fulcrum bolt shown in Fig. 4.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, 1 designates a main steam supply pipe for conducting superheated steam to a prime mover, (not shown), which pipe in practice is made of steel. Arranged in parallelism with and supported by the main supply pipe 1, is a by-pass or indicator tube 2, one end of which by-pass is connected to the main supply pipe 1 by means of a steel intake steam nozzle 3, the opposite end of said by-pass being adapted to be flexibly connected to the steam chest 21 of the prime mover, (not shown). The by-pass is made of copper and is supported from pipe 1 by means of brackets 4 so as to slide freely in its supported relation without restraining its freedom to expand or contract. Referring now particularly to Fig. 2, it will be noted that the steam nozzle 3 is provided at its upper portion with a screw threaded portion 5 adapted to be screwed into the main supply pipe 1, said screw threaded portion terminating in a wall or baffle plate 6, vertically disposed, which projects up into the steam pipe as clearly shown at the left hand side of Fig. 1. The lower end of the steam nozzle 3 is provided with a removable plug 7. Rigidly clamped to the steam pipe 1 is a bracket 8 pivoted to the lower end of which, by the pivot bar 9, is an indicating lever 10, the lower end of which lever 10 has pivotal relation at 11 with a member 12 fixed to by-pass 2. In Fig. 7, I have shown a detail of the pivot bar 9, shown in Fig. 4. Thus as the pipes 1 and 2 expand or contract the lever 10 must move with said pipes. The upper or free end of the lever is under spring tension as at 13 and is provided with a contact plate 14. Cooperatively arranged with respect to the upper end of the lever is an electrical contact device 15. It is comprised of a spring pressed contact 17 having a shoulder 18. A terminal of the spring pressed contact and said contact plate are in electrical connection by means of conductors 19 and 20 with an audible or visible signal, which for illustrative purposes may be a bell. As shown in Fig. 5 the contact 17 is endwise adjustable as at 16 so that the distance between the contact plate 14 of the lever 10 and the contact of the electrical device may be varied to suit different steam temperatures under which it may be desired to operate the device.

Having thus described the various structural parts of the device, a description at this time will be given of the mode of operation thereof. With superheated steam flowing through the main supply pipe 1, to a prime mover, a certain proportion thereof will also flow through the steam nozzle 3 and by-pass connection 2. It will be understood of course that the electrical contacting elements have been properly adjusted. The required distance may be determined approximately by a simple calculation, the elements of which are the temperature of the steam at which the power plant is expected to operate and the temperature corresponding to the condition of which the indicator is to give warning, the coefficients of expansion of the metals in the supply pipe and by-pass and the linear dimensions of the indicating lever. When the temperature of the steam in the supply pipe 1 and by-pass 2 falls, due to the presence of moisture in the steam or from other causes, the main supply pipe 1 and by-pass 2 contract. Since the by-pass 2 has a greater coefficient of expansion than the main supply pipe and also a higher thermal conductivity which causes the by-pass 2 to contract more rapidly than the supply pipe 1, the lever 10 is moved about its pivot point 9 a sufficient distance to cause the contact plate 14 of the lever 10 to close the circuit and thereupon give a notification of the fall in temperature. The steam nozzle 3 tends to act as a collector of moisture due to the baffle 6 and serves to deflect moisture or water of condensation to the by-pass 2. Thus steam within the by-pass having a greater proportion of moisture therein, the said by-pass is of a lower temperature than is the main supply pipe and hastens the action of the device. Operation of the device is also aided by lagging the by-pass 2.

The device may also be used to indicate a rise in temperature of the exhaust gases from an internal combustion engine by arranging the indicating lever and the electrical contacts so that the device operates on expansion rather than on contraction of the pipes. Under these conditions the electrical circuit is closed when the temperature of the exhaust gases reaches a predetermined maximum. This application of the device is of particular value in guarding against inefficient combustion as well as of against overloading the engine and damaging pistons, cylinders, cylinder heads, or other parts. It may be readily seen from the above described mode of operation that the device is equally applicable for use where a maximum as well as a minimum temperature between which it is necessary or desirable to maintain operating conditions is desired. In such case the indicating lever may be arranged with double contacts so as to give warning when either maximum or minimum temperature is reached.

Since the by-pass, or secondary fluid or steam conductor, that is, the indicator actuating pipe 2, is of relatively small diameter compared to the main steam pipe or primary fluid conductor 1, and while the fluid will flow therethrough in a positive and continuous stream, the actual amount of such secondary flow of fluid will be so small as to make this indicator device of my invention, independent of the size of the main or primary steam or fluid conductor.

Having thus described my invention, what I claim as new and desire to secure by Letters Patent is:

1. In apparatus of the character stated, a main supply pipe for superheated steam, a by-pass connector of a metal having a different coefficient of expansion and thermal conductivity than said main supply pipe, shunted across a suitable length of said main supply pipe, and said by-pass being capable of longitudinal displacement relative to said main supply pipe, means for permitting a positive, continuous and restricted flow of the superheated steam therethrough, and a pivotally mounted actuating lever operatively interposed between said main supply pipe and said by-pass and responsive to the relative displacements thereof due to the difference of superheated steam temperature from wet steam temperature.

2. In apparatus of the character stated, a main steam pipe, a by-pass connection of a metal having a different coefficient of expansion and thermal conductivity than said main steam pipe, shunted across a suitable length of said main steam pipe, and said by-pass connection, being capable of longitudinal displacement relative to said main steam pipe, means for permitting a positive, continuous and restricted flow of the fluid therethrough, a pivotally mounted actuating lever operatively interposed between said main steam pipe and said by-pass connection and responsive to the relative displacements thereof, and means for diverting the fluid into the by-pass connection.

In testimony whereof, I have hereunto signed my name.

NIELS CHRISTIANSEN.